UNITED STATES PATENT OFFICE.

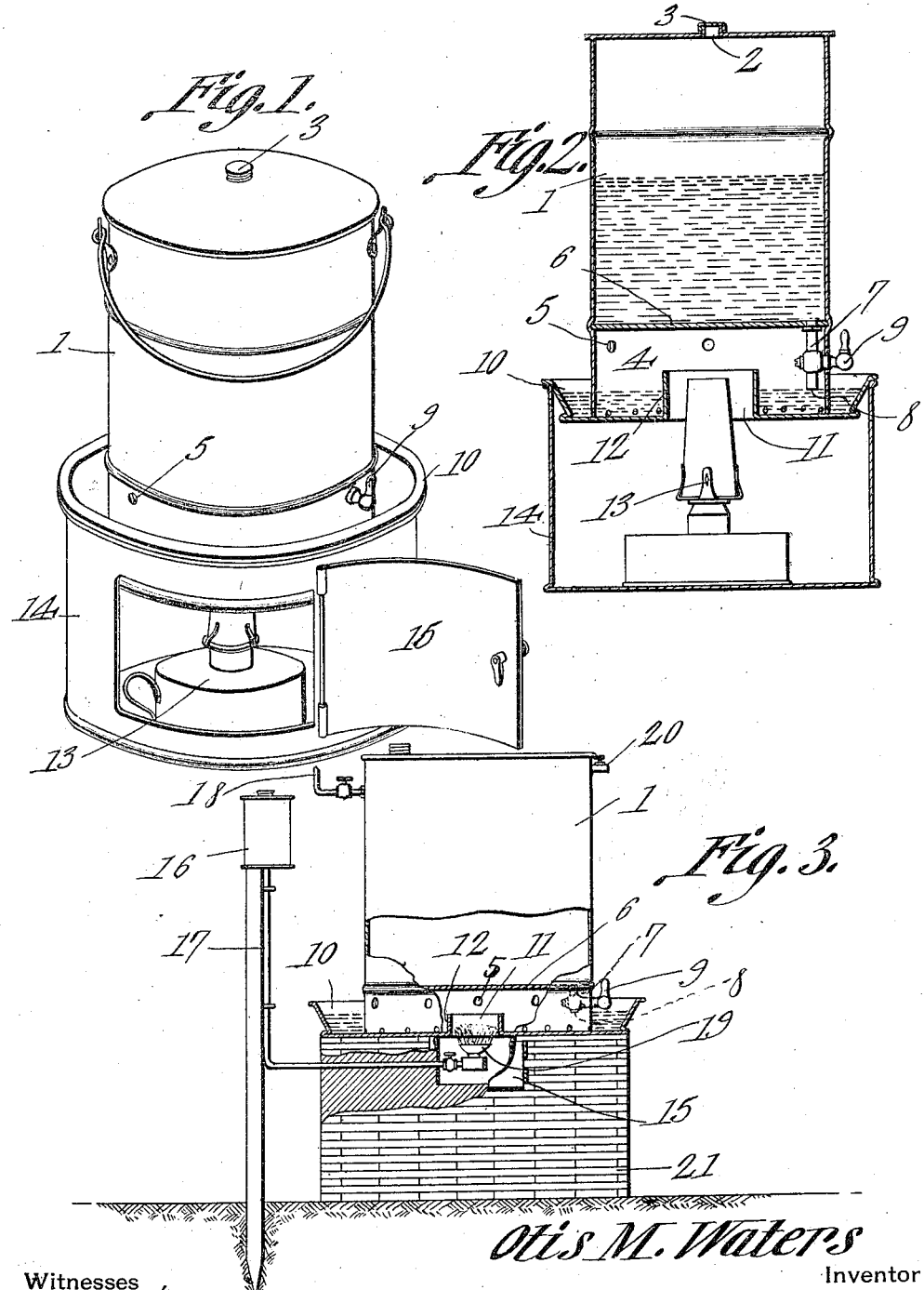
O. M. WATERS.
STOCK AND POULTRY DRINKING FOUNTAIN.
APPLICATION FILED MAY 15, 1912.
1,052,631.  Patented Feb. 11, 1913.

OTIS MARION WATERS, OF MOUNT VERNON, ILLINOIS.

STOCK AND POULTRY DRINKING-FOUNTAIN.

1,052,631. Specification of Letters Patent. Patented Feb. 11, 1913.

Application filed May 15, 1912. Serial No. 697,566.

*To all whom it may concern:*

Be it known that I, OTIS M. WATERS, a citizen of the United States, residing at Mount Vernon, in the county of Jefferson and State of Illinois, have invented new and useful Improvements in Stock and Poultry Drinking-Fountains, of which the following is a specification.

This invention pertains to improvements in devices or contrivances generally for the care of live stock, including poultry, more especially to drinking fountains therefor.

The invention has for its object to provide for automatically controlling or replenishing the supply of water to the drinking chamber as the water level is reduced.

A further object is to provide against the freezing or congealing of the water from climatic conditions.

A still further object is to maintain the contrivance and its environments in sanitary condition.

A still further object is to provide against casualty to the small poultry.

The invention consists of certain instrumentalities and features substantially as hereinafter fully disclosed and defined by the claim.

In the accompanying drawing, illustrating the preferred embodiment of my invention wherein it will be understood that various changes and modifications as relate to the detailed construction and arrangement of the parts may be made without departing from the spirit thereof, Figure 1 is a perspective view of the contrivance. Fig. 2 is a sectional elevation thereof. Fig. 3 is a modification of the invention, showing it as adapted more especially for live stock.

In carrying out my invention, I suitably provide a water-containing tank 1, preferably cylindrical in outline and having a filling-opening 2 in its upper end or top, closed by an air-tight closure or cap 3, said tank also having a hot air chamber 4 in its lower end, having air-inlet openings 5 in its walls, the bottom proper 6 of said tank forming the upper end or head of said hot-air chamber.

Dependable from the bottom proper 6 of the tank 1, within the hot-air chamber 4, is a water-supply and replenishing pipe 7, whose upper end communicates with the water-chamber or interior of said tank, while its lower end 8 dips into, or is immersed in the drinking pan or chamber, later described. Said pipe is equipped with a valve 9 for controlling the opening 8 of the pipe 7 and said valve having its handle adapted to be operated from the outside and to provide for closing said opening when the tank 1 is being supplied or replenished with water.

A pan or receptacle 10, having an outwardly and upwardly flared rim, furnishes a drinking chamber for the poultry or stock, and within this pan or receptacle is supported or positioned the tank 1. The pan or receptacle 10 has a central opening 11 through its bottom, for the reception of the chimney or stem of the heating medium, as an oil-lamp, an upwardly extending annular guard or wall 12 being secured around the edge of said opening to prevent the water entering said central opening, said lamp being designated as 13.

An upper-ended open base chamber or inclosure 14 having a suitable door-closed opening, is provided to receive or contain the lamp or heating means, the door or closure being designated as 15 and upon the upper open end of the base-chamber is superposed the drinking chamber or pan 10, its outwardly flared rim resting upon said end while the pan bodily is dependable within said inclosure to allow of its receiving a heating action therein.

Primarily the heater or apparatus provides for suitably heating the water in the tank 1 against freezing under conditions favorable thereto, while it is adapted also for use generally, or in mild seasons, when, of course, the drinking pan, with the water-tank, may be dismounted from the base member containing the heater, and be suitably otherwise disposed for its intended purpose.

It will be noted that the lower end of the water-supply or replenishing pipe 7 is adapted to be received within the drinking chamber or pan 10 and effect the replenishing supply so that the rising water will be arrested suitably below the upper edge of said pan to guard against overflowing the pan or chamber, as will be readily appreciated. It will be further noted that by thus locating the valve-equipped and apertured end of the water-supply pipe within the hot-air chamber, the valve is prevented from becoming inoperative and the aperture in said end of the pipe from becoming clogged or stopped up by the formation of ice around the same, as would otherwise occur in freezing weather.

It will be understood, of course, that, in filling the tank 1, the cap or closure 3 is first removed and the valve 9 actuated, so as to close the supply aperture 8, and that after such filling operation, the cap or closure is replaced and the valve again actuated to uncover the aperture or opening of the supply pipe.

In Fig. 3, as above indicated, the device is shown more especially, as it may be used for larger animals or stock, the tank being suitably valve pipe equipped for connection with a gasolene tank 16 and a pump (not shown), said valved pipes being designated as 17 and 18, respectively, for providing for supplying or replenishing the tank with water from such pump and for supplying gasolene to a burner 19 which may be used in lieu of a lamp, as above disclosed, a suitable air-venting valve 20 being provided in the upper end of said tank, and the pan 10 mounted upon masonry 21 instead of upon an inclosure or receptacle as above indicated.

What is claimed is:

A drinking fountain, including a water-container having a hot-air chamber, a pan having a central walled-opening therethrough, and having said water-container superposed thereon, a heater having its stack received by said central opening, and a water-supply pipe for said pan, leading from the bottom of said water-container, and extending into said hot-air chamber.

In testimony that I claim the foregoing as my own, I have hereto affixed my signature in the presence of two witnesses.

OTIS MARION WATERS.

Witnesses:
G. W. REID,
S. T. H. TAYLOR.